United States Patent
Morovic et al.

(10) Patent No.: US 10,003,719 B2
(45) Date of Patent: Jun. 19, 2018

(54) COLOR HALFTONE PROCESSING WITH MAPPING COLOR VALUES TO NPAC VALUES

(71) Applicant: HEWLETT-PACKARD DEVELOPMENT COMPANY, L.P., Houston, TX (US)

(72) Inventors: Peter Morovic, Sant Cugat del Valles (ES); Jan Morovic, Colchester (GB); Juan Manuel Garcia Reyero Vinas, Sant Cugat del Valles (ES); Marti Rius Rossell, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/305,251

(22) PCT Filed: Apr. 25, 2014

(86) PCT No.: PCT/EP2014/058515
§ 371 (c)(1),
(2) Date: Oct. 19, 2016

(87) PCT Pub. No.: WO2015/161896
PCT Pub. Date: Oct. 29, 2015

(65) Prior Publication Data
US 2017/0126931 A1     May 4, 2017

(51) Int. Cl.
*H04N 1/52* (2006.01)
*H04N 1/60* (2006.01)

(52) U.S. Cl.
CPC ............ *H04N 1/52* (2013.01); *H04N 1/6008* (2013.01); *H04N 1/6019* (2013.01); *H04N 1/6058* (2013.01)

(58) Field of Classification Search
None
See application file for complete search history.

(56) References Cited

U.S. PATENT DOCUMENTS

| 5,832,109 | A | 11/1998 | Mahy | |
| 7,463,385 | B2 * | 12/2008 | Gondak | H04N 1/6022 345/602 |
| 7,710,597 | B2 | 5/2010 | Edge | |

(Continued)

OTHER PUBLICATIONS

Morovic J et al. HANS: Controlling Ink-Jet Print Attributes Via Neugebauer Primary Area Coverages. IEEE Transactions on Image Processng IEEE Service Center, Piscataway, NJ, US, vol. 21, No. 2, Feb. 1, 2012. pp. 688-696, XP011412014, ISSN: 1057-7149, DOI: 10.1109/TIP.2011.2164418 the whole document.

(Continued)

*Primary Examiner* — Scott A Rogers
(74) *Attorney, Agent, or Firm* — HP Inc. Patent Department

(57) ABSTRACT

A method of color halftone processing is disclosed. A plurality of color mappings each provide a mapping from a color value in a color space to a set of Neugebauer Primary area coverage (NPac) values in an NPac space. An imaging metric is obtained for each NPac value in the set. An NPac value in the set is selected based on the imaging metric. The selected NPac value is used as an output NPac value in a combined color mapping for the color value.

18 Claims, 4 Drawing Sheets

(56) References Cited

U.S. PATENT DOCUMENTS

| | | | |
|---|---|---|---|
| 8,335,015 B2* | 12/2012 | Klassen | H04N 1/54 358/1.9 |
| 8,363,273 B2* | 1/2013 | Morovic | H04N 1/6033 358/1.15 |
| 8,593,692 B2 | 11/2013 | Chen et al. | |
| 9,626,607 B2* | 4/2017 | Morovic | G06K 15/027 |
| 2006/0221365 A1* | 10/2006 | Watanabe | |
| 2007/0002345 A1* | 1/2007 | Gondak | G06K 15/00 358/1.9 |
| 2008/0030787 A1 | 2/2008 | McElvain | |
| 2011/0063632 A1* | 3/2011 | Klassen | H04N 1/54 358/1.9 |
| 2011/0096344 A1* | 4/2011 | Morovic | H04N 1/6033 358/1.9 |
| 2017/0013174 A1* | 1/2017 | Morovic | H04N 1/6055 |
| 2017/0048420 A1* | 2/2017 | Morovic | G01J 3/46 |
| 2017/0064145 A1* | 3/2017 | Morovic | H04N 1/52 |

OTHER PUBLICATIONS

Wyble, et al A Critical Review of Spectral models Applied to Binary Color Printing. Nov. 28, 1998.

* cited by examiner

COLOR HALFTONE PROCESSING WITH MAPPING COLOR VALUES TO NPAC VALUES

BACKGROUND

Imaging systems are arranged to output an image. They may comprise printing or display systems, wherein an output is either a printed or displayed image. In these cases, color data for the image may be represented in a first color space and it may be necessary to map this color data to a second color space that is used to produce the output. To do this a color mapping may be used. In a halftone imaging system, the color mapping may be followed by a halftoning process so as to reproduce a continuous tone image represented in the second color space using a series of dot shapes. This may allow the continuous tone image to be output on an imaging device with a discrete number of output states, e.g. a printer capable of depositing a discrete number of colorant drops per output pixel. The result of this process is a halftone color separation. Each halftone color separation may have desired color properties in some part of a color space; however, it may not provide desired color properties across the whole of the color space.

BRIEF DESCRIPTION OF THE DRAWINGS

Various features and advantages of certain examples will be apparent from the detailed description which follows, taken in conjunction with the accompanying drawings, which together illustrate, by way of example only, a number of features, and wherein.

DETAILED DESCRIPTION

Figure 1:
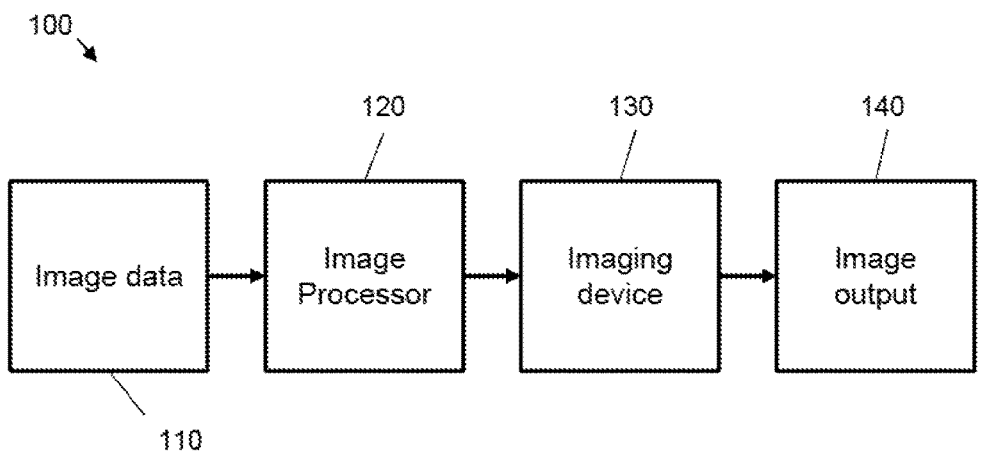
FIG. 1 is a schematic diagram of an image processing pipeline according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to color mapping an imaging system. Color mapping is a process by which a first representation of a given color is mapped to a second representation of the same color. Although "color" is a concept that is understood intuitively by human beings, it can be represented in a large variety of ways. For example, in one case a color may be represented by a power or intensity spectrum across a range of visible wavelengths. However, this is a high dimensionality representation and so typically a color model is used to represent a color at a lower dimensionality. For example, certain color models make use of the fact that color may be seen as a subjective phenomenon rooted in the retinal and neural circuits of a human brain. In this case, a "color" may be defined as a category that is used to denote similar visual perceptions; two colors are said to be the same if they produce a similar effect on a group of one or more people. These categories can then be modelled using a lower number of variables.

Within this context, a color model may define a color space. A color space in this sense may be defined as a multi-dimensional space, wherein a point in the multi-dimensional space represents a color value and dimensions of the space represent variables within the color model. For example, in a Red, Green, Blue (RGB) color space, an additive color model defines three variables representing different quantities of red, green and blue light. Other color spaces include: a Cyan, Magenta, Yellow and Black (CMYK) color space, wherein four variables are used in a subtractive color model to represent different quantities of colorant, e.g. for a printing system; the International Commission on Illumination (CIE) 1931 XYZ color space, wherein three variables ('X', 'Y' and 'Z' or tristimulus values) are used to model a color, and the CIE 1976 (L*, a*, b*—CIELAB) color space, wherein three variables represent lightness ('L') and opposing color dimensions ('a' and 'b'). Certain color models, such as RGB and CMYK may be said to be device-dependent, e.g. an output color with a common RGB or CMYK value may have a different perceived color when using different imaging systems.

When working with color spaces, the term "gamut" refers to a multi-dimensional volume in a color space that represents color values that may be output by the imaging system. A gamut may take the form of an arbitrary volume in the color space wherein color values within the volume are available to the imaging system but were color values falling outside the volume are not available. The terms color mapping, color model, color space and color gamut, as explained above, will be used in the following description.

As used herein, the term "color separation" refers to the output of a color mapping and halftoning process. In certain cases, a color separation may comprise multiple colorant components, e.g. one for each colorant in a printing system. The term "color separation" will be used herein to refer to the result of combining each of the multiple colorant components, rather than each of the colorant components themselves. Although certain printing device examples have been described with reference to one or more colorant levels, it should be understood that any color mappings may be extended to other printing fluids such as glosses and/or varnishes that may be deposited in a printing system and that may alter a perceived output color.

Certain examples described herein provide for a re-generation or "re-hashing" of a color separation. In certain examples, a plurality of input color separations are combined. Each input color separation may have desired properties in some portion of a given color space but lack desired properties across the whole of the color space. Certain examples as described herein enable these input color separations to be combined to generate a composite color separation that has improved properties across a wider portion of the color space.

Certain examples described herein also provide for generation of custom color mappings from a plurality of individual color mappings. For example, custom nodes, e.g. mapping points, used to implement a color mapping may be used to generate a new color mapping that has particular desired properties.

FIG. 1 shows an example of an image processing pipeline. Certain examples described herein may be implemented within the context of this pipeline. In the example of FIG. 1, image data 110 is passed into an image processor 120. The image data 110 may comprise color data as represented in a first color space, such as pixel representations in an RGB color space. The image processor 120 maps the color data from the first color space to a second color space for use by an imaging device 130 to generate an image output 140. As discussed in more detail below, the second color space may comprise a Neugebauer Primary area coverage (NPac) color space. Color data in an NPac space may be used to implement one or more halftone portions in an image output 140. The imaging device may comprise one or more of a printing device 130 and a display 150. For example, the image processor may be arranged to output one or more of print control data that is communicated to a printing device and image control data that is communicated to a display device. A printing device may be arranged to generate a print output as instructed by the print control data. Likewise, a display device may be arranged to generate a display output as instructed by the image control date. The color representation used by any printing device and any display device may be different. In one case, a print output may comprise an image formed from colored inks deposited on a substrate. The substrate may be paper, fabric, plastic or any other suitable print medium. Similarly, a display output may comprise an image formed from a plurality of Light Emitting Diodes or Liquid Crystal Display elements. In certain cases only one of a printing device and a display device may be used. The image processor may be separate from, or combined with, the imaging device.

As described above, certain examples herein are arranged to output color data in a Neugebauer Primary area coverage (NPac) space. An NPac space provides a large number of metamers that facilitate the generation of a combined color separation, e.g. provide a large number of output color values that map to a common input color value in one or more of XYZ, Lab and RGB color spaces.

An NPac represents a distribution of one or more Neugebauer Primaries (NPs) over a unit area. For example, in a binary (bi-level) printer, an NP is one of $2^k$ combinations of k inks within the printing system. For example, if a printing device uses CMY inks and two printing levels there can be eight NPs, these NPs relate to the following: C, M, Y, C+M, C+Y, M+Y, C+M+Y, and W (white or blank indicating an absence of ink). Other examples may also incorporate multi-level printers, e.g. where print heads are able to deposit N drop levels, in this case an NP may comprise one of $N^k$ combinations of k inks within the printing system, e.g. a CMY printing system with 3 drop levels (0, 1 or 2 drops per pixel) may have 27 NPs.

Figure 2:
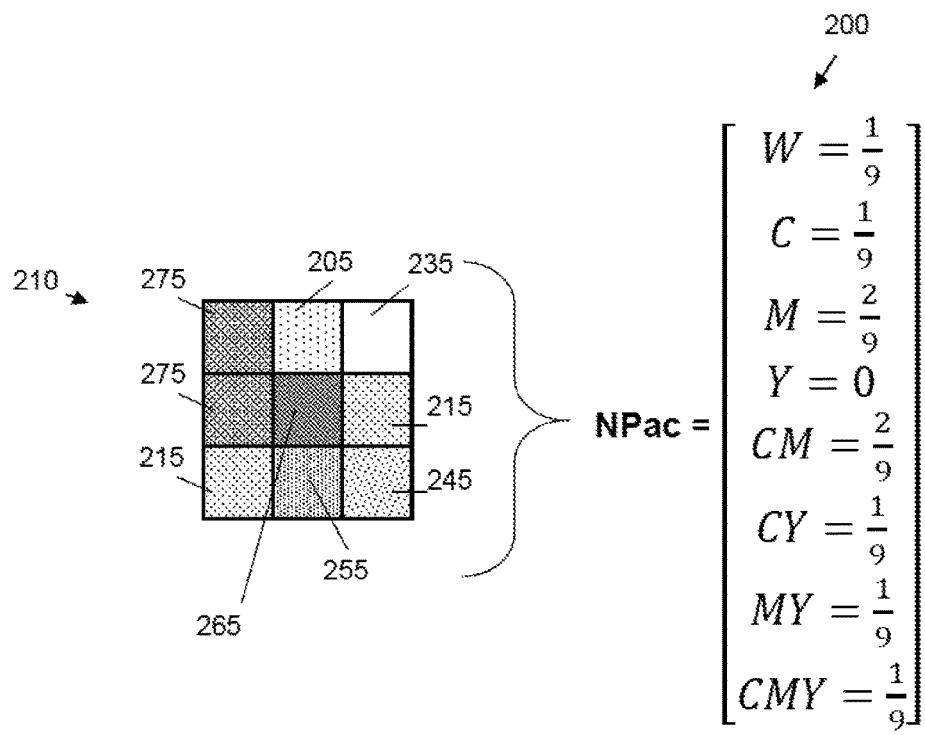
FIG. 2 is a schematic diagram showing a representation of a Neugebauer Primary area coverage vector according to an example.

FIG. 2 shows an example NPac vector 200 for a CMY imaging system. This example shows a unit area for an output image that comprises a three-by-three pixel area 210. In implementations the unit area for an NPac may depend on the resolution of the imaging system (e.g. dots per square inch in a printing system). The NPac vector 200 defines the area coverages of the eight NPs for the unit area; for example, in this case: one pixel of White (W) (235); one pixel of Cyan (C) (205); two pixels of Magenta (M) (215); no pixels of Yellow (Y); two pixels of Cyan+Magenta (CM) (275); one pixel of Cyan+Yellow (CY) (245); one pixel of Magenta+Yellow (MY) (255); and one pixel of Cyan+Magenta+Yellow (CMY) (265). As can be seen, the component values of each NPac vector sum to one, i.e. to represent the total area of the unit area.

Although an example three-by-three pixel area is shown in FIG. 2, this is for ease of explanation; the unit area may be of any size and/or there may be multiple levels of units. For example, an n by n millimeter region may comprise a unit area and an imaging device may be arranged to output areas of NP to match an NPac vector definition. In one case, an NPac vector may be approximated for a particular unit area, with any error being diffused or propagated to neighboring unit areas, such that for a given level the error between an output image and an NPac vector is minimized. Likewise, although a CMY system is described for this example for ease of explanation, other imaging systems may be used.

According to certain examples described herein, an NPac color space is used as a domain within which a color separation is defined, as compared to ink or colorant vectors as is the case in comparative imaging pipelines. In these examples, the indexing space in which a color mapping process and a halftoning process communicate is NPac space. This is in contrast to a comparative colorant vector pipeline wherein color mapping is performed to a colorant vector space, and then halftoning is performed on continuous tone data in the colorant vector space to generate an output image. In contrast, in certain present examples, a halftone image on a substrate comprises a plurality of pixels or dots wherein the spatial density of the pixels or dots is defined in NPac color space and controls the colorimetry of an area of the image, i.e. the halftoning process implements the area coverages as defined in the NPacs. An example of an imaging system that uses NPac values in image processing is a Halftone Area Neugebauer Separation (HANS) pipeline.

Figure 3:
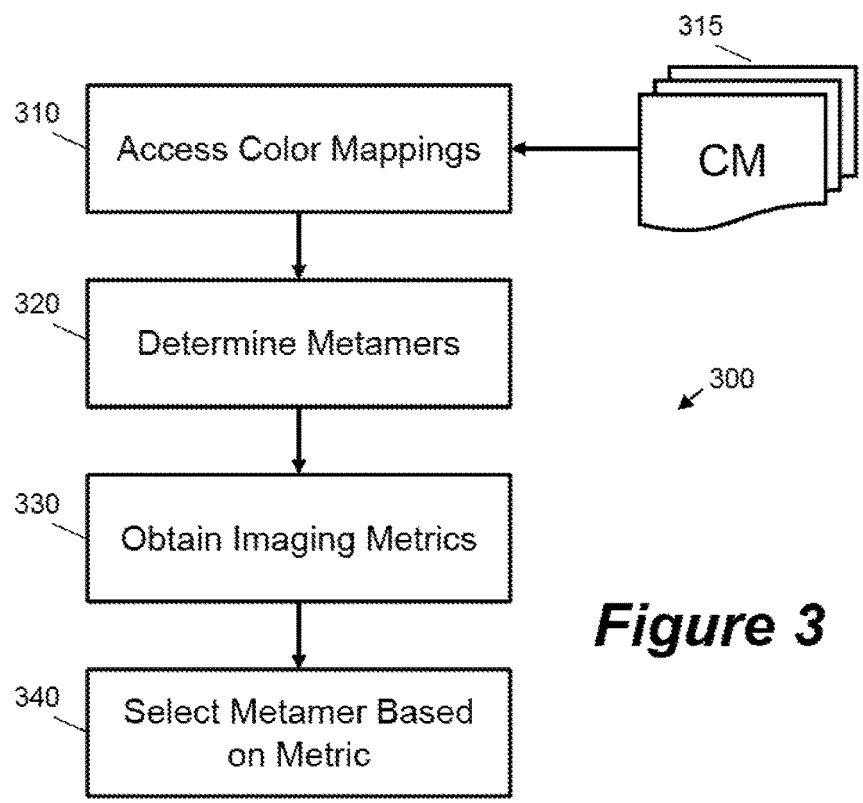
FIG. 3 is a flow diagram showing a method of color halftone processing according to an example.

FIG. 3 shows a method of color halftone processing 300 according to an example. At block 310, a plurality of color mappings 315 are accessed. Each color mapping 315 provides a mapping from a color value in a color space to a set of NPac values in an NPac space. For example, the color space may comprise one of an RGB color space, a CMYK color space, a CIE Lab color space and a CIE XYZ color space. The color space may be based on these color spaces, e.g. either comprise the color space directly or be a modified version of the space, such as a Yule-Nielsen modified XYZ color space. A color mapping may be implemented by way of a look-up table. The look-up table may comprise nodes, e.g. entries, that map a color value in the first color space to NPac space. In one case, this look-up table may map color values in three dimensions to NPac values in multiple dimensions (e.g. eight for CMY). Color mappings for values that lie between nodes in the look-up table may be determined using interpolation, e.g. using linear and/or non-linear interpolation.

At block 320, for a given color value in the color space, a plurality of NPac values are determined that result from each of the plurality of color mappings. For example, due to the presence of NPac metamers for particular colormetric values, e.g. each RGB, XYZ or Lab color value may be represented by a plurality of different NPac vectors. In this case these different NPac vectors are determined for the given color value. In a simple case, where there are two color mappings that are each implemented by a RGB-to-NPac look-up table, there may be two NPac values—one resulting from each of the color mappings.

At block 330, one or more imaging metrics are obtained for each NPac value. These imaging metrics may comprise, amongst others, one or more of an ink use metric, a grain appearance metric and a spectral reflectance metric. For example, the metric may represent ink use for each NPac vector, grain appearance for each NPac vector and/or visual resemblance to desired spectral reflectance value. The imaging metrics may also, alternatively or as well, comprise any other metric characterizing attributes that depend on the patterns in which the dots are laid down. For example, an imaging metric may comprise a "color inconstancy" metric that indicates a reflectance value of the NPac that changes the least under different illuminants and/or a "metamerism" metric that indicates a reflectance value of the NPac that is closest to an original or source reflectance value, such that both the NPac and the original reflectance value change equally under different illuminants. The imaging metrics may be computed or retrieved, e.g. looked up based on previous computations. At block 340, one of the plurality of NPac values, e.g. in the form of an NPac vector, may be selected based on a comparison of the obtained imaging metrics. In one case, a metamer in the form of an NPac vector may be selected from a plurality of NPac vectors that is optimal across the set of imaging metric values. For example, an NPac vector may be selected that minimizes ink use, minimizes grain appearance and/or that most closely resembles a desired spectral reflectance. In this case, the selected one of the plurality of NPac values is used as an output NPac value for the given color value for the plurality of color mappings. For example, this may comprise generating a custom look-up table node that has the given color value as an input color value and the selected NPac value as a mapped color value. In certain cases, a plurality of imaging metrics may be optimized in a multi-dimensional optimization, e.g. an NPac vector may be selected that uses the least ink while also reducing a grain size metric. The method 300 may be repeated for a plurality of given color values, e.g. for nodes in a look-up table, to generate a custom color mapping comprising a plurality of nodes. In another case, the selected NPac value may be used as a custom node in a pre-existing color mapping, e.g. one of the input color mappings 315.

In certain examples, each color mapping may comprise a color separation process in an NPac imaging system, e.g. may represent a color separation that has been generated according to a particular color processing. In this case, the output of method 300, when repeated for a plurality of given color values, may be a custom color separation, e.g. as represented by a new custom look-up table. In an RGB-to-NPac case this may comprise a custom RGB-to-NPac look-up table. The number of nodes in such a look-up table may comprise a union of the nodes in each input look-up table implementing color mappings 315. In certain cases the color mappings 315 may comprise matching RGB node sets, e.g. full color separations with one or more common color values, or a series of partial RGB-to-NPac look-up tables that need to be combined.

Figure 4:
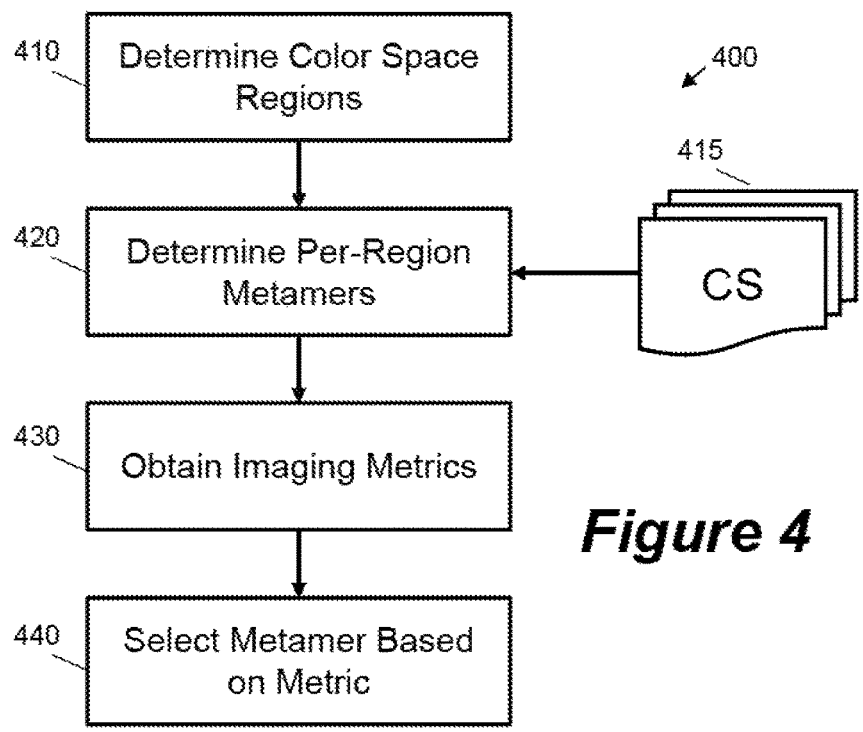
FIG. 4 is a flow diagram showing a method of color halftone processing according to another example.

FIG. 4 is another example of a method of color halftone processing that uses similar blocks to combine a plurality of color separations. At block 410, a set of color space regions in a color space are determined, wherein each color space region has one or more uniform color properties. For example, the color space may comprise a CIE Lab color space and each region may represent a region of Lab color space with uniform Lab color values, e.g. uniform Lab bins. At block 420, the plurality of color separations 415 to be combined are examined. If the color separations are represented in NPac space, then an NPac-to-Lab, or NPac-to-XYZ then XYZ-to-Lab, mapping may be performed to determine all NPac vectors represented by the color separations. In these cases, a colorimetric-to-NPac mapping may be available a priori. These NPac vectors are then grouped by color space region, e.g. any NPac vectors from all color separations that map to a common uniform Lab color value are grouped in per-region sets. At block 430, per color space region processing is performed on the determined sets of NPac vectors. For a particular color space region, one or more imaging metrics are obtained for each NPac vector in the per-region set. These imaging metrics may comprise the imaging metrics discussed with reference to block 330 above. The imaging metrics may be calculated when performing the method or may be pre-computed and retrieved. At block 440, in a similar manner to block 340, one NPac vector is selected for each color space region based on a comparison of the one or more imaging metrics. For example, an NPac vector may be selected that is optimal for one or more of the obtained imaging metrics. Each selected NPac vector is then used within a color mapping for the plurality of color separations to be combined, the color mapping being from uniform Lab values to NPac vectors. When repeated for a plurality of color space regions, the result of method 400 comprises a new color separation with known colorimetric to NPac mappings. The new color separation may optimally combine desired properties of each individual color separation 315. The new color separation may be implemented by way of a look-up table, in a similar manner to the previous example. As such, using this example, two or more color separations, which are computed at different points in time or under different conditions, may be combined into a single, new color separation with desired color properties.

The resulting color mapping from the method 300 of FIG. 3, and/or the resulting color separation from the method 400 of FIG. 400, may represent a union, in terms of color gamuts, of the respective input color mappings 315 and color separations 415. The resulting color mapping or color separation may be optimal when compared to the individual, input mappings or separations in terms of one or more defined imaging metrics that are computable from each NPac represented in those mappings or separations. Certain examples, such as the method 400, may also be adapted to take an arbitrary list of NPacs and their predicted or measured XYZ colorimetries and select a representative set of suitable NPacs for a color mapping or look-up table. Similarly, existing color separations in an NPac imaging pipeline may be "re-hashed" to generate a new color mapping or look-up table that includes selected NPacs from the color separations that improve one or more imaging metrics of interest. This in effect enables an improved set of halftone patterns to be generated from a set of color separations. This is not possible in an imaging pipeline that uses colorant channels, as there is no unique colorant to halftone mapping. Attempting to perform the methods 300 and 400 in a colorant pipeline results in output image artifacts. However, as halftone colorimetries are set uniquely by defined NPac values, and feature, for example, transitioning in an optically-additive area coverage domain, an NPac imaging pipeline allows such re-hashing while minimizing undesired artifacts. Certain methods also allow the insertion of custom nodes in a color mapping when, for example, a set of desirable NPac values are required for a given set of RGB nodes.

A variation of the above example methods will now be described that enables a color mapping to be re-sampled. This variation has a benefit of increasing the number of candidate NPac values, for example in blocks 320 and 420 as described above. First, a color-space-to-NPac sampling is defined that has a resolution lower than one or more input color mappings, e.g. 315 or 415. Second, a set of color values are determined that map to a common lower-resolution color space value. For example, a set of color values may be binned based on a new sub-sampled color value.

Third, for each set of color values that map to the common lower-resolution color space value, e.g. each set of color values in each sub-sampled bin, the set of NPac values are determined, e.g. based on the original, higher resolution color mapping. Imaging metrics for these NPac values are then compared to select one desired NPac value to represent the common lower-resolution color space value.

The variation described above may be performed for color values in RGB color space or XYZ color space. It has the effect of increasing the set of NPac values or vectors at blocks 320 and 420. This in turn results in a larger set of imaging metrics to be compared at blocks 340 and 440.

In another variation, the example methods described herein may be used to introduce custom look-up table nodes based on particular a-priori preferences. For example it may be desirable for a given RGB color to be reproduced with a specific NPac found or designed to be best independently of metrics considered for the overall look-up-table such as ink-use or grain. This is achieved by simply adding the RGB node with the aforementioned NPac to the LUT. For example, two ink-use optimized XYZ-to-NPac color separations may be combined with an imaging metric that is representative of desired color properties for particular spot colors. Whereby the specific spot-color would be exempt from the overall optimization criterion. For example, certain colors, such as those for a particular brand, may require a good visual match to a defined spectral color despite ink-use optimizations. In this case, the imaging metric may define a (spectral) color difference between one or more spot colors and an NPac value. In this case, when the color separations are combined the resulting color separation would be generally ink-use optimized but would have custom look-up table nodes with good spectral matching for spot colors where ink-use is secondary.

Figure 5:
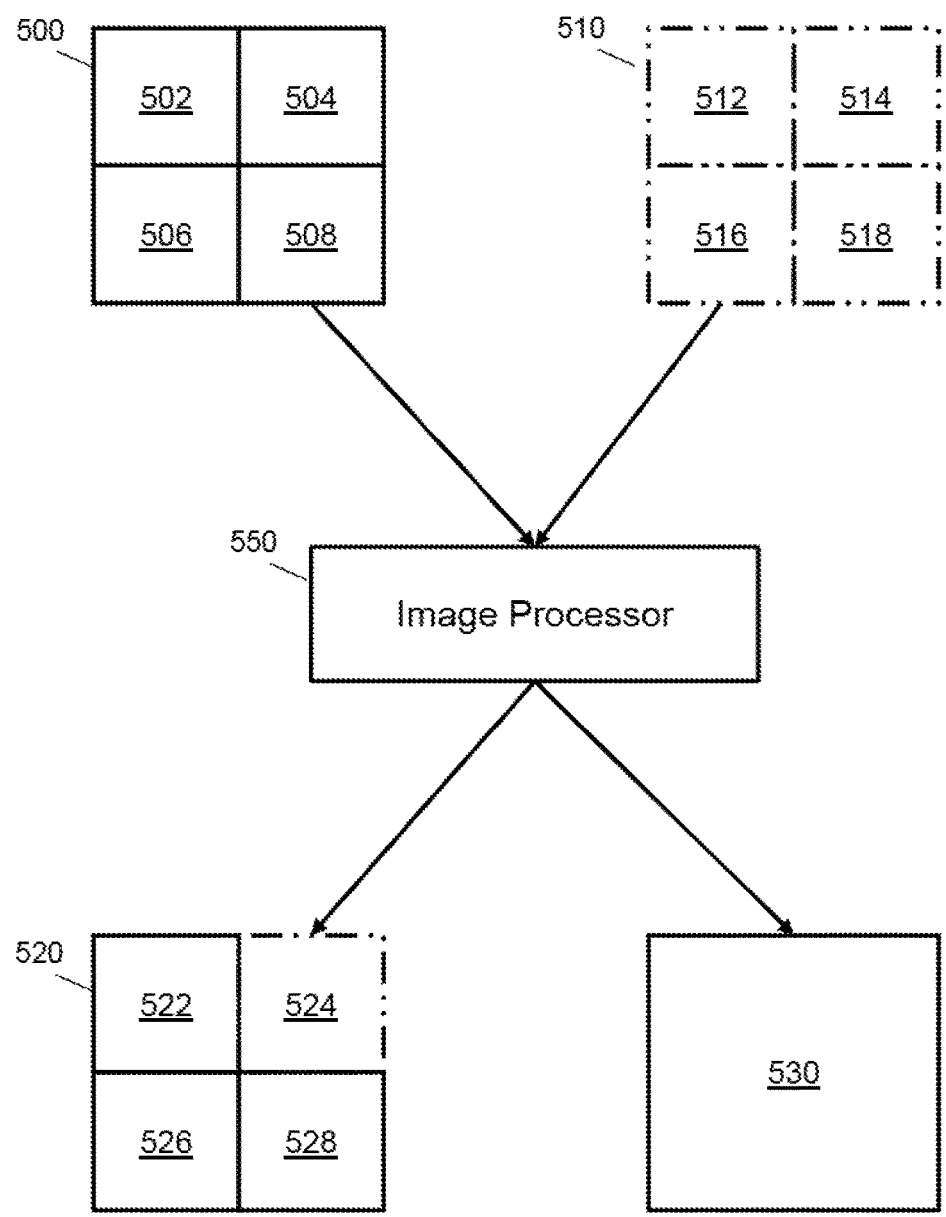
FIG. 5 is a schematic diagram illustrating a combination of two color separations according to an example.

FIG. 5 shows an image processor 550 that may be used to implement certain example methods as described herein. The image processor 550 receives a first color separation 500 and a second color separation 510. Each color separation comprises four areas with varying color properties. The first color separation 500 comprises areas 502 to 508 and the second color separation 510 comprises areas 512 to 518. The color properties may relate to color values in a color space, e.g. XYZ, Lab or RGB properties, or NPac values. As depicted by the dashed lines, the areas of the second color separation 510 have different color properties to the first color separation 500.

In use, the image processor 550, which may be image processor 120 in FIG. 1, is arranged to combine the two color separations 500 and 510 to generate a combined color separation. To do this the image processor 120 applies one or more of the previously described example methods. In FIG. 5, a third combined color separation 520, has three areas 522, 526 and 528 wherein an NPac is selected based on the color properties of the first color separation 500. A fourth area 524 has an NPac selected based on the color properties of the second color separation 510. The selection of these areas may be based on one or more imaging metrics as previously discussed, hence the third color separation 520 may provide improved image properties when compared to the first and second color separations 500, 510.

FIG. 5 also shows a fourth color separation 530 that has been generated using the sub-sampling variation described above. In this case, the sub-sampling bins values from each of the four areas of each color separation. As such, imaging metrics for NPacs associated with each of areas 502 to 508 and 512 to 518 may be compared to determine a single NPac from the eight NPac values to use in the sub-sampled color separation.

Figure 6:
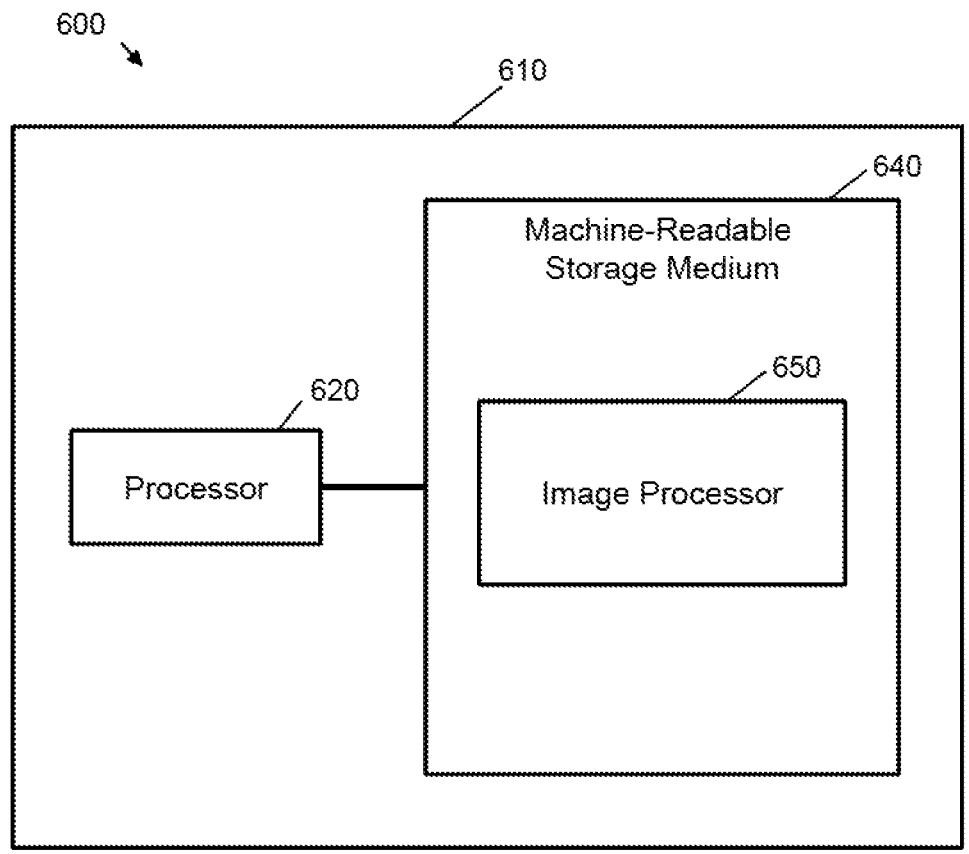
FIG. 6 is a schematic diagram showing a processing device according to an example.

Certain methods and systems as described herein may be implemented by a processor that processes computer program code that is retrieved from a non-transitory storage medium. FIG. 6 shows an example 600 of an imaging device 610 comprising a machine-readable storage medium 640 coupled to a processor 620. In certain case the imaging device 610 may comprise a computer; in other cases the imaging device may comprise a printer, scanner, display device or the like. Machine-readable media 640 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 6, the machine-readable storage medium comprises program code to implement an image processor 650 and data representative of one or more color mappings 660. The image processor 650 may implement one or more of the methods described above.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of color halftone processing comprising:
   accessing a plurality of color mappings, each color mapping providing a mapping from a color value in a color space to a set of Neugebauer Primary area coverage (NPac) values in an NPac space of an imaging device;
   for each color value of a plurality of color values in the color space:
      determining a plurality of NPac values that result from each of the plurality of color mappings;
      obtaining imaging metrics for each NPac value; and
      selecting one of the plurality of NPac values for the color value based on a comparison of the obtained imaging metrics to each other,
      wherein the selected one of the plurality of NPac values is used as an output NPac value for the color value for the plurality of color mappings;
   mapping each input color value of a plurality of input color values of an input image to a corresponding output color value of a plurality of output color values, the corresponding output value being the selected output NPac value for the input color value; and
   outputting the input image, by the imaging device, using the output color values to which the input color values of the input image have been mapped.

2. The method of claim 1, wherein determining the plurality of NPac values comprises:
   determining color space region comprising the given color value, the color space region having one or more uniform color properties; and
   determining a plurality of NPac values that map to the color space region.

3. The method of claim 1, wherein:
   each color mapping is modeled using a color-space-to-NPac look-up table, the given color value comprises a node within each look-up table, and the selected one of the plurality of NPac values provides a custom mapping from each of the nodes.

4. The method of claim 3, wherein determining the plurality of NPac values comprises:

determining a color-space-to-NPac sampling that has a resolution lower than that of one or more of the color-space-to-NPac look-up tables;

determining a set of color space values that map to a common lower-resolution color space value; and determining a plurality of NPac values that correspond to the set of color space values.

5. The method of claim 1, wherein the color space comprises one of: a Red, Green, Blue (RGB)-based color space; a Cyan, Magenta, Yellow and Black (CMYK)-based color space; an International Commission on Illumination (CIE) Lab-based color space and a CIE XYZ-based color space.

6. The method of claim 1, wherein the imaging metric comprises one or more of:

an ink use metric;
a grain appearance metric; and
a spectral reflectance metric.

7. The method of claim 1, wherein the plurality of color mappings represent a respective plurality of color separations and the method is repeated for a plurality of given color values in the color space to provide a plurality of selected NPac values that represent a color mapping for a combination of the plurality of color separations.

8. The method of claim 1, wherein the imaging device is a printing device, and outputting the input image comprises printing the input image.

9. The method of claim 8, wherein the printing device is an inkjet-printing device.

10. The method of claim 1, wherein the imaging device is a display device, and outputting the input image comprises displaying the input image.

11. A method of combining a plurality of color separations comprising:

determining a set of color space regions in a color space of an imaging device, each color space region having a uniform color property;

for each color space region, determining a per-region set of Neugebauer Primary area coverage (NPac) vectors for any color values that are present in the plurality of color separations to be combined;

obtaining imaging metrics for each NPac vector in each per-region set;

selecting one NPac vector for each color space region based on a comparison of the imaging metrics to one another, each selected NPac vector being representative of a color mapping for the plurality of color separations to be combined;

mapping a plurality of input color values of an input image to a plurality of output color values using the color mapping of which each selected NPac vector is representative; and outputting the input image, by the imaging device, using the output color values to which the input color values of the input image have been mapped.

12. The method of claim 11, wherein the one or more uniform color properties comprises a uniform CIE Lab value.

13. The method of claim 11, wherein the imaging metric comprises one or more of:

an ink use metric;
a grain appearance metric; and
a spectral reflectance metric.

14. The method of claim 11, wherein the color space is a colorimetric color space and each color separation represents a colorimetric-to-NPac color mapping.

15. A non-transitory machine-readable storage medium encoded with instructions for color halftone processing, the instructions executable by a processor of a system to cause the system to:

access a plurality of color mappings, each color mapping providing a mapping from a color value in a color space to a set of Neugebauer Primary area coverage (NPac) values in an NPac space of an imaging device;

for each color value of a plurality of color values in the color space:

determine a plurality of NPac values that result from each of the plurality of color mappings;

obtain imaging metrics for each NPac value; and select one of the plurality of NPac values based on a comparison of the obtained imaging metrics to each other, wherein the selected one of the plurality of NPac values is used as an output NPac value for the color value for the plurality of color mappings;

mapping each input color value of a plurality of input color values of an input image to a corresponding output color value of a plurality of output color values, the corresponding output value being the selected output NPac value for the input color value;

outputting the input image, via the imaging device, using the output color values to which the input color values of the input image have been mapped.

16. The machine-readable storage medium of claim 15, wherein the instructions are executable by the processor of the system to cause the system to:

determine a color space region comprising the given color value, the color space region having one or more uniform color properties; and determine a plurality of NPac values that map to the color space region.

17. The machine-readable storage medium of claim 15, wherein the instructions are executable by the processor of the system to cause the system to:

determine a color-space-to-NPac sampling that has a resolution lower than that of one or more of color-space-to-NPac look-up tables;

determine a set of color space values that map to a common lower-resolution color space value; and determine a plurality of NPac values that correspond to the set of color space values.

18. The machine-readable storage medium of claim 15, wherein the imaging metric comprises one or more of:

an ink use metric;
a grain appearance metric; and
a spectral reflectance metric.

* * * * *